(12) United States Patent
Kim (10) Patent No.: US 8,112,035 B2
(45) Date of Patent: Feb. 7, 2012

(54) SENSOR DEVICE, SENSOR NETWORK SYSTEM, AND SENSOR DEVICE CONTROL METHOD (75) Inventor: Nam Yun Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 366 days.

(21) Appl. No.: 12/375,601

(22) PCT Filed: Nov. 13, 2007

(86) PCT No.: PCT/KR2007/005686
§ 371 (c)(1),
(2), (4) Date: Jan. 29, 2009

(87) PCT Pub. No.: WO2008/060082
PCT Pub. Date: May 22, 2008

(65) Prior Publication Data
US 2009/0325486 A1 Dec. 31, 2009

(30) Foreign Application Priority Data

Nov. 13, 2006 (KR) .................. 10-2006-0111623
Nov. 13, 2007 (KR) .................. 10-2007-0115232

(51) Int. Cl.
*H04B 7/00* (2006.01)
(52) U.S. Cl. ................ 455/41.2; 455/41.1; 455/41.3
(58) Field of Classification Search ............... 455/41.1, 455/41.2, 41.3
See application file for complete search history.

(56) References Cited

U.S. PATENT DOCUMENTS

| 5,892,441 | A  | * | 4/1999  | Woolley et al. | 340/539.26 |
| 7,599,686 | B2 | * | 10/2009 | Quinn et al.   | 455/423    |
| 2003/0072445 | A1 | * | 4/2003 | Kuhlman et al. | 380/42    |
| 2006/0105716 | A1 |   | 5/2006 | Jung et al.    |            |
| 2006/0154642 | A1 | * | 7/2006 | Scannell, Jr.  | 455/404.1 |

FOREIGN PATENT DOCUMENTS

| CN | 1773478 A       | 5/2006 |
| KR | 10-2005-0032533 | 4/2005 |
| KR | 10-0682450      | 2/2007 |
| WO | WO-2006-068382  | 6/2006 |

OTHER PUBLICATIONS

Office Action dated Jun. 15, 2011 in Chinese Application No. 200780029975.5, filed Nov. 13, 2007.

* cited by examiner

*Primary Examiner* — Tuan H Nguyen
(74) *Attorney, Agent, or Firm* — Saliwanchik, Lloyd & Eisenschenk

(57) ABSTRACT

Disclosed are a sensor device and a sensor device control method. The sensor device comprises a reader for requesting a tag information and detecting an interference channel, and a short range wireless communication module for sharing a information of the interference channel through short range wireless communication, and reallocating channels to be used for the reader.

13 Claims, 6 Drawing Sheets

SENSOR DEVICE, SENSOR NETWORK SYSTEM, AND SENSOR DEVICE CONTROL METHOD

CROSS-REFERENCE TO RELATED APPLICATION

This application is the U.S. national stage application of International Patent Application No. PCT/KR2007/005686, filed Nov. 13, 2007, the disclosure of which is hereby incorporated by reference in its entirety.

TECHNICAL FIELD

The embodiment relates to a sensor device, a sensor network system, and a sensor device control method.

BACKGROUND ART

A ubiquitous network technology allows a user to smoothly access various networks regardless of time and location. A radio frequency identification (RFID) technology is an example of such a ubiquitous network technology.

Generally, the RFID technology relates to a tag and a reader. The tag is attached to objects such as goods in order to record details of the objects, and the reader makes RF communication with the tag to obtain the information about the object from the tag. Accordingly, the RFID technology provides an infrastructure capable of effectively processing supply chain management (SCM) including the distribution, the assembly, the price change, and the marketing of goods.

Since the RFID reader cooperates with the tag moving at a high speed, a radio environment of the RFID reader is significantly changed, and a signal received in the RFID reader is greatly changed according to the change of an external environment. In particular, a frequency interference phenomenon between RFID readers exerts an influence on a recognition rate of an RFID tag.

DISCLOSURE OF INVENTION

Technical Problem

The embodiment provides a sensor device, a sensor network system, and a sensor device control method, capable of improving a tag recognition rate.

The embodiment provides a sensor device, a sensor network system, and a sensor device control method, capable of minimizing the interference between readers.

Technical Solution

An embodiment provides a sensor device, comprising: a reader for requesting a tag information and detecting an interference channel, and a short range wireless communication module for transmitting or receiving a information of the interference channel through short range wireless communication to share the interference channel information.

An embodiment provides a sensor device, comprising: a reader for requesting a tag information and detecting an interference channel, and a short range wireless communication module for sharing a information of the interference channel through short range wireless communication, and reallocating channels to be used for the reader.

An embodiment provides a sensor network system, comprising: a sensor for making communication with a tag, and transmitting a node information comprising a information of the tag and a interference channel information, a coordinator module for collecting the node information of the sensor, and a sever for reallocating a channel of the sensor based on the node information collected from the coordinator module and transmitting a information of the reallocated channel.

An embodiment provides a sensor device control method, comprising: detecting an interference channel from a reader of a sensor, sharing a information of the interference channel with a neighboring sensor if the interference channel is detected, and reallocating an available channel to the reader except for the interference channel.

Advantageous Effects

In a sensor device, a sensor network system, and a sensor device control method according to the embodiment, a tag recognition rate can be enhanced.

In addition, the tag recognition rate is enhanced, so that the reliability of an RFID technology can be improved.

Further, the interference between neighboring readers can not be able to consider a lot, so that the degree of freedom for reader arrangement can be ensured.

An RFID system can be effectively constructed regardless of surrounding environment or surrounding facilities.

A control system of readers over a network is not complicated.

In addition, initial and present states of readers in a sensor network are monitored in real time, so that the readers can be effectively managed.

BEST MODE FOR CARRYING OUT THE INVENTION

Hereinafter, a sensor device and a sensor network according to the embodiment will be described with reference to accompanying drawings.

Figure 1:
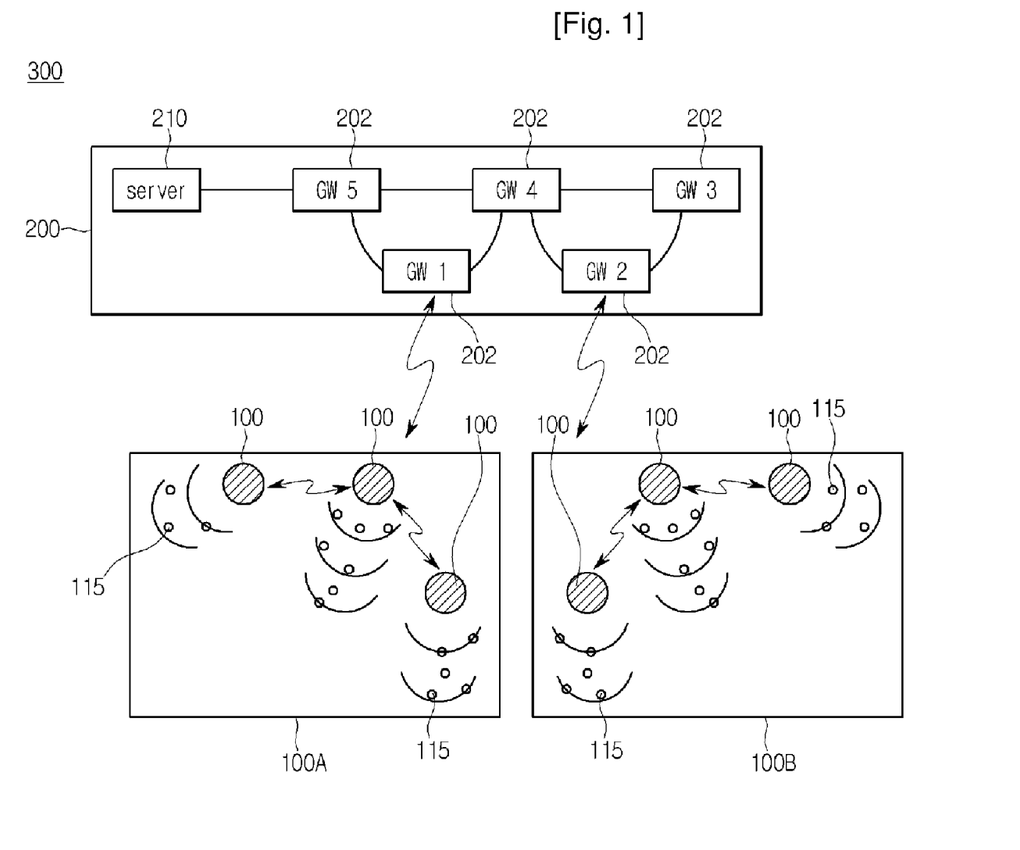
FIG. 1 is a view showing a sensor network system according to the embodiment.

FIG. 1 is a view showing a sensor network system 300 according to the embodiment.

Referring to FIG. 1, the sensor network system includes sensor networks 100A and 100B and an access network 200. The sensor networks 100A and 100B include a plurality of sensor nodes 100, and each sensor nod 100 collects information from a tag 115 in a corresponding cell area. The access network 200 includes a plurality of gateway modules 202 and a server 210. The gateway module 202 can access Internet as a backbone network, deliver information that is collected from the sensor node 100 to the server 210, and deliver control data that is transmitted from the server 210 to the sensor networks 100A and 100B. The server 210 monitors, manages, and controls the sensor node 100.

The sensor nodes 100 share various information between them through short range wireless communication. The shared information includes interference channel information and channel allocation information.

The sensor network system 300 may manage at least one of the sensor networks 100A and 100B based on a ubiquitous sensor network (USN). Channel allocation for each sensor node 100 is achieved in the sensor network 100A or 100B, or by the server 210. In a node-type frequency counting mode or a network-type frequency counting mode, a new channel may be reallocated except for interference channels.

Figure 2:
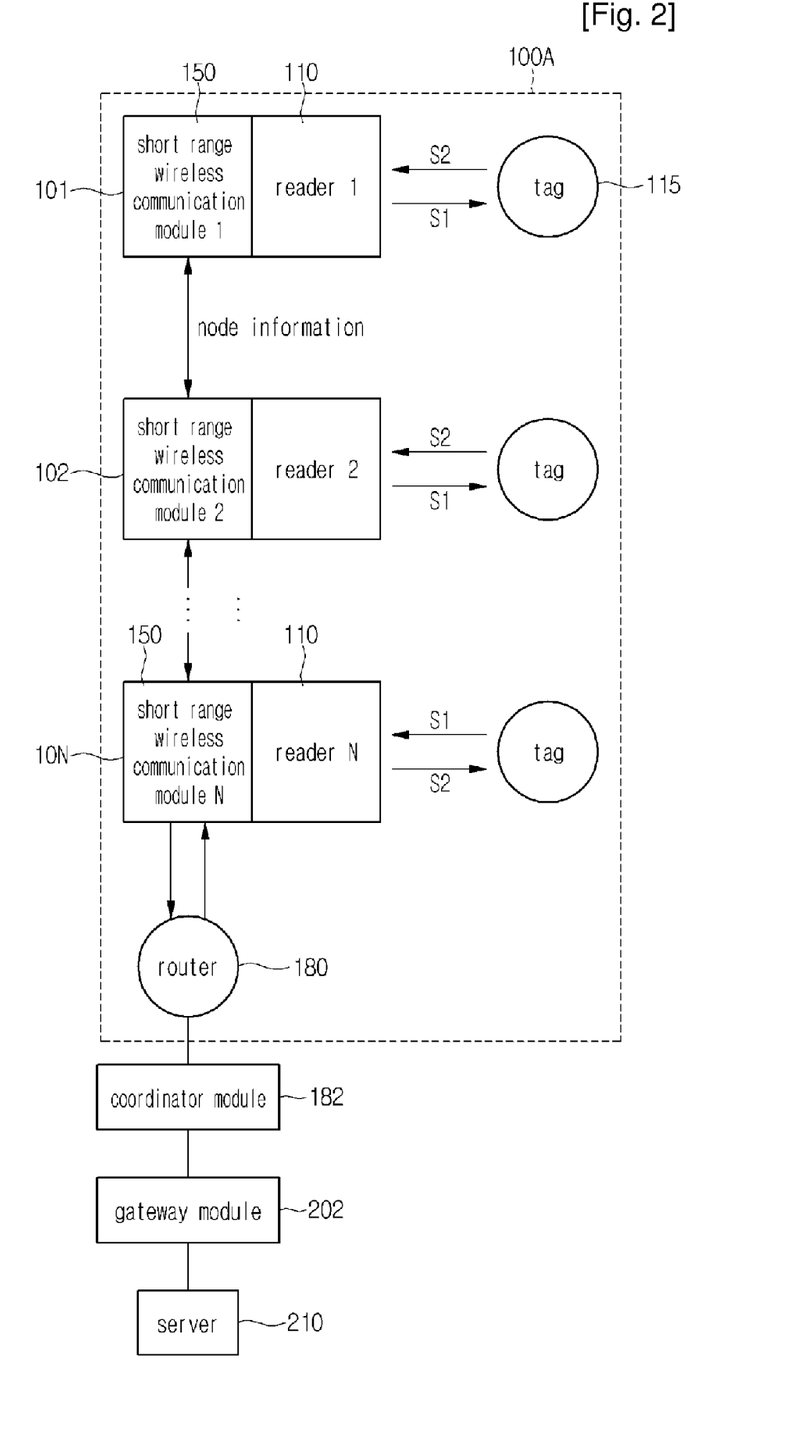
FIG. 2 is a view showing a node-type frequency counting mode according to the first embodiment.

FIG. 2 is a view showing the node-type frequency counting mode according to the first embodiment.

Referring to FIG. 2, the sensor network 100A includes a plurality of sensor nodes 101 to 10N, a tag (or transponder) 115, and a router 180. Each sensor node 101 or 10N includes a reader (or interrogator) 110 and a short range wireless communication module 150. The reader 110 and the tag 115 constitute an RFID system, and the reader 110 transmits an information requesting signal to the tag 115 (reference number S1) and receives detailed information about an object from the tag 115 (reference number S2) to collect data of the tag 115.

The tag 115 has various shapes and sizes. In detail, the tag 115 is classified into an active tag and a passive tag according to a power supply state, and into a low-frequency system and a high-frequency system according to used frequency bands. Such a tag is attached to objects such as persons, vehicles, freights, livestock, and buildings to record detailed information of the objects.

The short range wireless communication module 150 may be realized as a ZigBee module. The short range wireless communication module 150 is connected to the reader 110 through a universal asynchronous receiver/transmitter (UART) to receive/transmit information from/to the reader 110. The short range wireless communication module 150 makes communication with another short range communication module within a short range wireless network. The short range wireless communication module 150 may be realized through at lest one selected from a ZigBee module, a wireless LAN or WiFi, a ultra wide band (UWB), Bluetooth, a world interoperability for microwave access (WiMax), wireless broadband (WiBro), and a dedicated short range communication (DSRC).

The RFID communication scheme and the short range wireless communication scheme employ different frequency bands for communication. In detail, the RFID communication scheme for the reader 110 may employ a ultra-high frequency band (e.g., 860 MHz to 960 MHz),and the short range wireless communication scheme may employ a microwave band(e.g., 2.4 GHz). Such a communication band is an illustrative purpose only, and the band may be modified within the spirit and the scope of the embodiment.

The router 180 is a wireless router, that is, a ZigBee router, and may expand the sensor network 100A including the sensor nodes 101 to 10N. For example, the sensor network 100A may be constructed in the form of a star topology or a mesh topology.

A coordinator module 182 is provided at the terminal of the sensor network 100A to make communication with the sensor nodes 101 to 10N through the router 180. The coordinator module 182 initializes and manages sensor nodes in the sensor network 100A, transmits information, which is collected from the sensor nodes 101 to 10N, to the gateway module 202, and transmits the control data of the serve 210 to the sensor network 100A.

The gateway module 202 is interposed between the coordinator module 182 and the server 210 to make data communication. The server 210 controls the sensor nodes 101 to 10N by using the information of the sensor nodes 101 to 10N.

The sensor nodes 101 to 10N are allocated with channels through the node-type allocation mode. According to the node-type channel allocation scheme, the sensor nodes 101 to 10N in the sensor network 100A share information about interference channels and used channels between them, and are allocated with channels except for the interference channels through a frequency counting mode. For example, an interference channel occurs in the first sensor node 101, and the information about the interference channel is delivered to all sensor nodes 102 to 10N in the sensor network 100A through the first short range wireless communication module 150 such that the sensor nodes 102 to 10N share the information about the interference channel between them. In this case, the first short range wireless communication module 150 delivers channels, node IDs, and tag information, which are used by the readers later, together with the information about the interference channel. Accordingly, the short range wireless communication module 150 delivers available channels except for the interference channel and channels used by other readers to the reader 110.

In this case, the short range wireless communication module 150 shares node information, receives information about interference channels and available channels to select an available channel from among remaining channels through frequency counting, and delivers the information to the short range wireless communication module 150 of a next sensor node. Thus, the sensor nodes 101 to 10N in the sensor network 100A can select available channels except for the interference channels, and the readers 110 make communication with the tags 150 through the available channels. The readers 110 in the sensor network 110A occupy different channels.

The readers 110 in the sensor network 100A occupy different channels to make communication with the tag 115. For instance, readers 110 occupy at least 15 channels, which are formed with the interval of an occupation frequency of 200 KHz within Korean RFID UHF frequencies of 908.5 Mhz to 914 Mhz, in different time slots to make communication with the tag 115. The number of the channels is changeable according to the available frequency band of countries. For instance, the interval of an occupation frequency is 200 KHz within European UHF RFID frequencies of 865 MHz to 868 MHz, and the interval of an occupation frequency is 500 KHz within U.S. UHF RFID frequencies of 902 MHz to 928 MHz. However, the present invention is not limited thereto.

In addition, the information about node IDs, interference channels, used channels, and tags of the sensor nodes 101 to 10N is delivered to the coordinator module 182 through the router 180. The coordinator module 182 collects all information in the sensor network 100A, and delivers the information to the server 210 through the gateway module 202. The server 210 manages the sensor nodes 101 to 10N based on the information collected through the gateway module 201.

Figure 3:
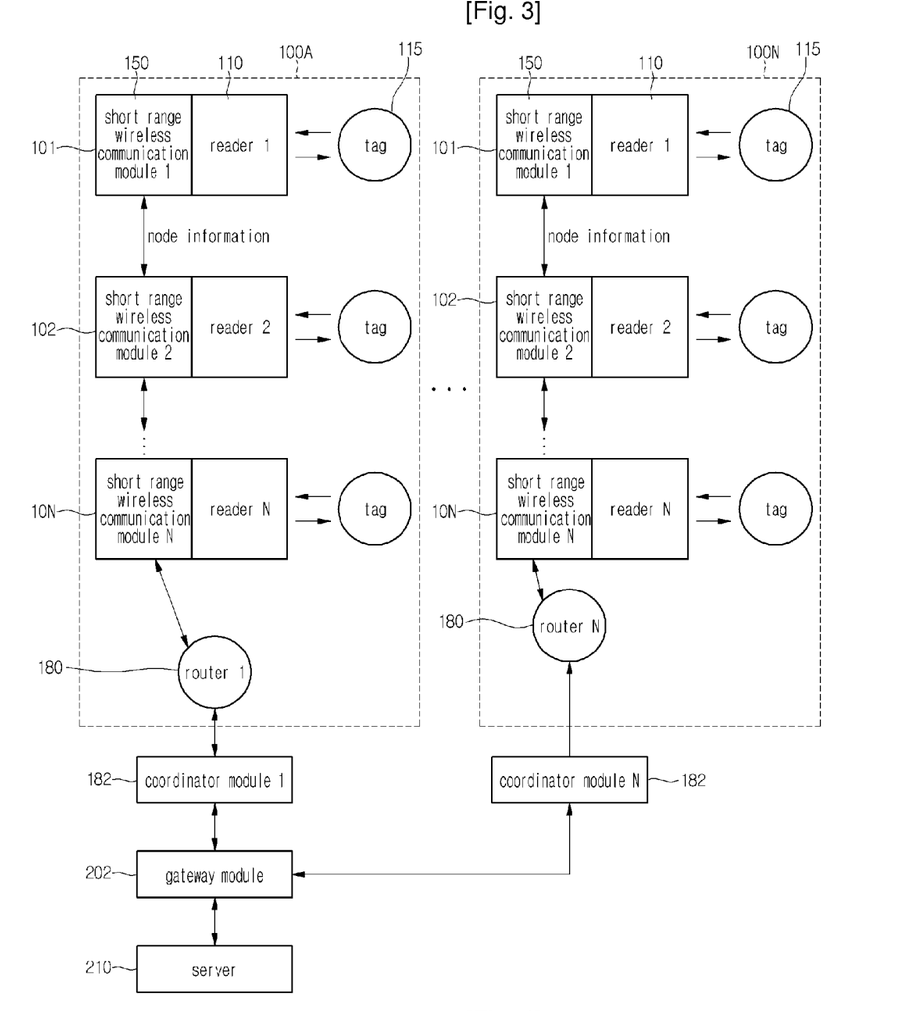
FIG. 3 is a view showing a network-type frequency counting according to the second embodiment.

FIG. 3 is a view showing the network-type frequency counting mode according to the second embodiment.

Referring to FIG. 3, the server 210 manages a plurality of sensor networks 100A to 100N, and collects node IDs and interference channels that are node information, and tag information. The server 201 resumes channel allocation by performing frequency counting with respect to channels except for interference channels in the network 100A to 100N which have been subject to channel interference. Thus, channels of the readers 110 in the sensor networks 100A to 100N are allocated.

The server 210 stores tag information collected from the readers 110, and reallocates channels according to nodes by using channels except for interference channels. The channel allocation data are delivered to each coordinator module 182 through the gateway module 202. Each coordinator module 182 transmits channel allocation data to all sensor nodes 101 to 10N through the router 180. The channel allocation data are delivered to the sensor nodes 101 to 10N through a reverse path. At this time, the channel allocation data are divided for several sensor network groups or entire sensor network groups.

The sensor nodes 101 to 10N make communication with the tags 115 by using node IDs and allocated channels. In detail, the short rang radio communication module of the sensor nodes 101 to 10N extracts the allocated channel based on the node ID and delivers the information about the extracted channel to the reader 110. The reader 110 makes communication with the tag 115 by using a frequency corresponding to the channel.

According to the second embodiment, the server 210 collects information about interference channels in a cell and reallocates channels based on the information about the interference channels. According to such a channel allocation scheme, since the server 210 reallocates channels based on the interference channels, communication is made without interference channels.

Figure 4:
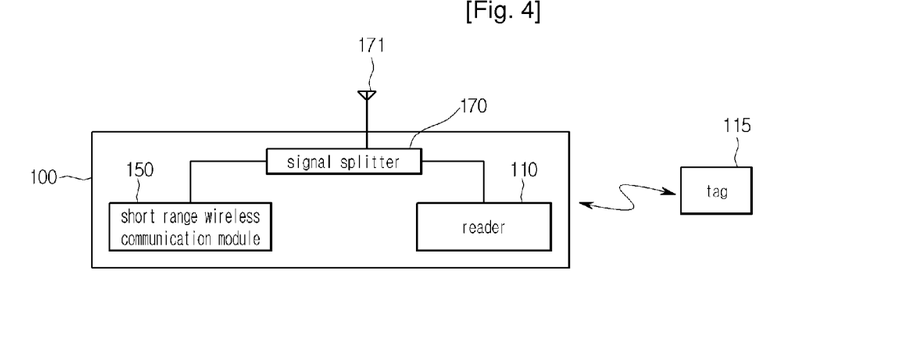
FIG. 4 is a block diagram showing a sensor node according to the embodiment.

FIG. 4 is a block diagram showing the sensor node according to the embodiment.

Referring to FIG. 4, the sensor node 100 includes the reader 110, the short range wireless communication module 150, a signal splitter 170, and an antenna 171. In the sensor node 100, the reader 110, the short range wireless communication module 150 and the signal splitter 170 may be realized in the form of a single chip.

The reader 110 makes communication with the tags 115 existing in an RFID network through a wireless communication medium. Such a reader 110 transmits an information requesting signal to the tag 115 through the antenna 171 and the signal splitter 170, and receives detailed information about an object from the tag 115, thereby collecting data of the tags 115. The short range wireless communication module 150 may be realized as a ZigBee module. In addition, short range wireless communication modules existing in a ZigBee network make communication with each other.

The signal splitter 170 is connected between the reader 110 and the short range wireless communication module 150 and the antenna 171. Such a signal splitter 170 inputs or outputs an RF signal for the reader 110 or the short range wireless communication module 150 through the antennal 171. The signal splitter 170 includes, for example, a switching integrated circuit such as a multiplexer. The signal splitter 170 may be installed in the reader 110 or the short range wireless communication module 150, or may be separated from the reader 110 or the short range wireless communication module 150. According to the embodiment, although the sensor node 100 employs one antenna, a plurality of antennas may be provided so that the reader 110 and the short range wireless communication module 150 individually make communication, and the present invention is not limited thereto.

The reader 110 makes communication with the tags 115 by using an allocated channel for occupied time. In other words, the reader 110 makes communication with the tag 115 by using a channel having no interference among a plurality of channels.

The reader 110 measures the intensity of a signal received from the tag 115, creates information about an interference channel based on the intensity of the received signal, and delivers the interference channel information to the short range wireless communication module 150. The short range wireless communication module 150 shares channel interference information with another short range wireless communication module. Accordingly, the channel interference information may be recognized between neighboring readers 110, so that communication may be made between the readers 110 through a channel having no interference. Accordingly, a tag recognition rate can be improved.

Figure 5:
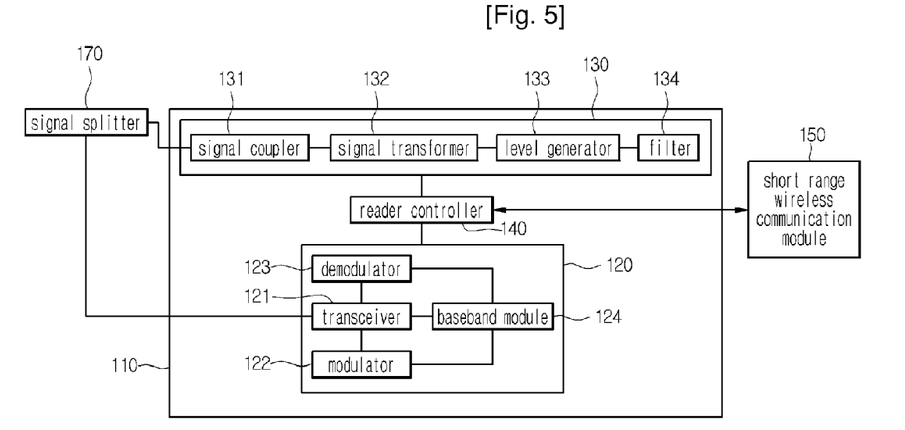
FIG. 5 is a block diagram showing a detailed structure of a reader according to the embodiment.

FIG. 5 is a block diagram showing a detailed structure of the reader 110 according to the embodiment.

Referring to FIG. 5, the reader 110 includes an RF processor 120, an interference channel detector 130, and a reader controller 140. The RF processor 120 performs RF communication, and includes a transceiver 121, a modulator 122, a demodulator 123, and a baseband module 124. The RF processor 120 is subject to the control of the reader controller 140.

The transceiver 121 transmits/receives an RF signal through a signal splitter 170. The modulator 122 modulates data to be transmitted into the oscillation frequency and outputs the data to the transceiver 121. The demodulator 123 demodulates a signal received from the transceiver 121 into a tag information. The baseband module 124 processes transmitted data into an analog signal, and processes a received signal into a digital signal. In this case, as an encoding scheme of the reader 110, pulse interval encoding (PIE) may be used. The modulator 122 may employ an amplitude-shift keying (ASK) scheme. In detail, the modulator 122 may employ a double-sideband ASK (DSB-ASK) scheme, a single-sideband ASK (SSB-ASK) scheme, or a phase-reversal ASK (PR-ASK) scheme. Such schemes do not limit the embodiment.

The interference channel detector 130 receives a signal received from the antenna (reference number 171 of FIG. 4) or the signal splitter 170 to measure the intensity of the received signal, detect the intensity of the measured signal, and then deliver the intensity to the reader controller 140. Such an interference channel detector 130 includes a signal coupler 131, a signal transformer 132, a level generator 133, and a filter 134. The signal coupler 131 performs a coupling operation with respect to a signal received through the signal splitter 170 and then outputs the signal to the signal transformer 132. The signal coupler 131 may be realized by using a coupling capacitor or a directional coupler. The signal transformer 132 transforms the coupled signal into a stabilized intermediate-frequency signal. In particular, such a signal transformer 132 transforms the coupled signal into the stabilized intermediate-frequency signal when the received signal is an unstable high-frequency signal. The level generator 133 converts the intermediate-frequency signal into a level signal having a DC voltage level and outputs the level signal to the filter 134. The level generator 133 outputs the level signal corresponding to a decibel value proportional to the intermediate-frequency signal, thereby improving the signal reception sensitivity of a power level. The filter 134 detects an interference channel by removing a noise component of the DC voltage level and delivers the information about the interference channel to the reader controller 140. In addition to the information about the interference channel, the filter 134 delivers monitored information of a setting state of a present reader and a tag ID collected from the reader.

The reader controller 140 delivers the information about the interference channel and the tag information to the short range wireless communication module 150 when the interference channel exists.

The reader controller 140 outputs its channel interference information to the short range wireless communication module 150 and receives information about an available channel from the short range wireless communication module 150. In this case, since the short range wireless communication module 150 shares the interference information with other short range wireless communication modules, the short range wireless communication module 150 may recognize channel interference information of all readers 110. Accordingly, the short range wireless communication module 150 reflects the information about the interference channel when counting channels to be used and delivers the result to the reader 110.

The short range wireless communication module 150 performs channel hoping through a time-frequency hopping spread spectrum (T-FHSS) scheme. The FHSS scheme employs a phase shift keying (PSK) technology to perform channel hopping with respect to several tens of independent channels in a random hopping sequence so that data are transmitted/received. In this case, a frequency hopping scheme employs a listen before talk (LBT) scheme as well as the FHSS scheme. The LBT scheme is to detect available channels before transmitting data and make communication only if empty channels exist. One or the mixture of the FHSS scheme and the LBT scheme may be employed for such a frequency occupation scheme. In addition, a direct sequence spread spectrum (DSSS) scheme may be employed for the frequency occupation scheme.

The reader controller 140 receives parameter values for the FHSS based on the interference information from the short range wireless communication module to control the RF processor 120, and the RF processor 120 generates an oscillation frequency in a channel index sequence to make communication with the tag through a corresponding channel. In other words, the reader controller 140 processes information related to frequency hopping through a channel coding scheme using a time-frequency hopping spread spectrum (T-FHSS) scheme.

The reader controller 140 controls the operation of the RF processor 120, thereby adjusting an oscillation frequency applied to the modulator 122 of the RF processor 120.

Figure 6:
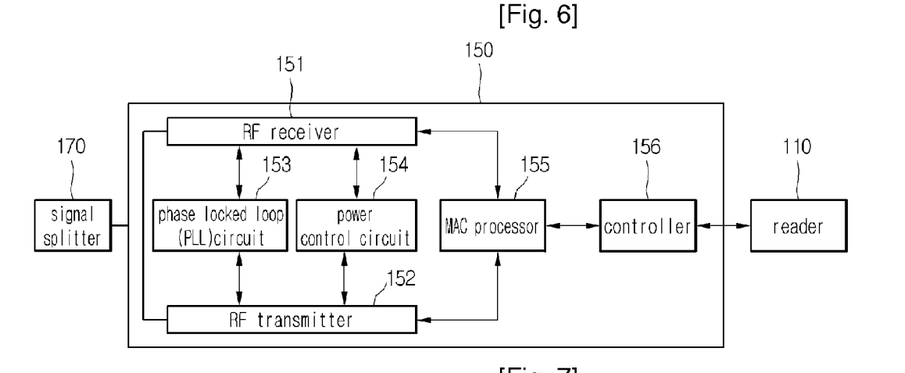
FIG. 6 is a block diagram showing a detailed structure of a short range wireless communication module of FIG. 4.
Figure 7:
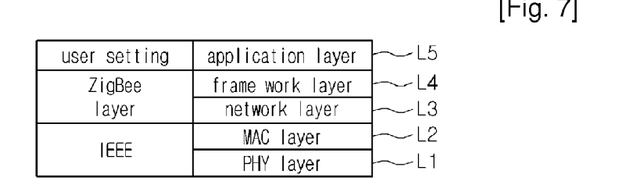
FIG. 7 is a view showing a communication protocol stack of a short range wireless communication module of FIG. 4.

FIG. 6 is a block diagram showing the detailed structure of the short range wireless communication module of FIG. 4, and FIG. 7 is a view showing a communication protocol stack of the short range wireless communication module of FIG. 4.

Referring to FIG. 6, the short range wireless communication module 150 includes an RF receiver 151, an RF transmitter 152, a phase locked loop (PLL) circuit 153, a power control circuit 154, a MAC processor 155, and a controller 156.

The RF receiver 151 and the RF transmitter 152 are connected to the antenna through the signal splitter 170, and the controller 156 transmits/receives tag information and interference channel information with the reader 110. In this case, the controller 156 may be connected to the reader 110 through a wire interface, that is, a UART connector (e.g., RS-232C DTE interface).

The RF receiver 151 and the RF transmitter 152 process received/transmitted signals and transmit/receive node information to/from each other in a short range wireless communication band. The phase locked loop (PLL) circuit 153 provides a reference frequency signal to the RF receiver 151 and the RF transmitter 152, and the power control circuit 154 determines the intensity of a received signal to adjust an amount of transmit power. The RF receiver 151, the RF transmitter 152, the phase locked loop (PLL) circuit 153, and the power control circuit 154 operate through a physical layer (PHY Layer) (reference number L1 of FIG. 7) of a short range wireless communication protocol (e.g., ZigBee) so that an RF communication structure and a network topology are determined.

The controller 156 receives tag information and interference channel information from the reader 110 and performs frequency counting with respect to channels to be used, except for interference channels so that a channel is allocated to the reader 110. The controller 156 delivers the tag information and the node information including the interference channel information and the use channel information to another sensor node such that the sensor nodes share the information between them. The above internode channel sharing scheme is to prevent an interference channel from being allocated to another node, and corresponds to the node-type frequency counting mode. In addition, the node information of the sensor nodes is transmitted to the server.

In the network-type frequency counting mode, instead of the controller 156, the server collects interference channel information and tag information of readers to reallocate a channel of each reader except for interference channels and transmits channel allocation data to a sensor node. In this case, the controller 156 of the short range wireless communication module 150 extracts a channel corresponding to its node ID from the channel allocation data and transmits the channel to the reader. The reader may make communication with a tag through a channel having no interference. The node-type frequency counting mode and the network-type frequency counting mode are set in the first stage, or selected by an operator according to a network characteristic.

The RF receiver 151 and the RF transmitter 152 use the DSSS. The RF receiver 151 and the RF transmitter 152 employ offset-quadrature phase-shift keying modulation (QPSK) with a 32-PN code length in a band of 2.4 GHz, and binary phase-shift keying (BPSK) modulation with a 15 PN-code length in a sub-1 GHz band. The MAC processor 155 analyzes a frame structure of transmitted data to approve the frame, detects errors, determines data retransmission, and process packet routing after digital processing is completed of a PHY layer (reference number L1 of FIG. 7).

In addition, the controller 156 performs functions of a MAC layer, a network layer (reference number L3 of FIG. 7), and a framework layer (reference number L4 of FIG. 7) to construct a network topology. The controller 156 performs the function of an application layer (reference number L5 of FIG. 7) to transmit data such as interference information.

As shown in FIG. 7, the physical layer (reference number L1) and the MAC layer (reference number L2) use the IEEE 802 standard. According to the IEEE 802.15.4 standard, two kinds of physical layers (2.4 GHz, 866/915 MHz) are defined, 16 channels, 10 channels, and 1 channel are allocated in a band of 2.4 GHz, a band of 920 MHz to 928 MHz, and a band of 868 MHz to 870 MHz. The number of the channels may be changed according to a channel bandwidth, and the present invention is not limited thereto.

Figure 8:
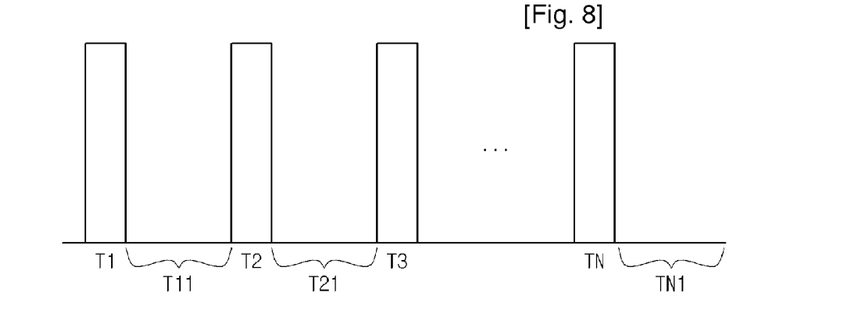
FIG. 8 is a view showing switching time of an RF reader according to the embodiment.

FIG. 8 is a view showing switching time of an RF reader according to the embodiment.

Referring to FIG. 8, time points T1, ..., TN represent starting time points of readers in a sensor network, and interval T11, ..., TN1 represent channel occupation time of the readers.

Figure 9:
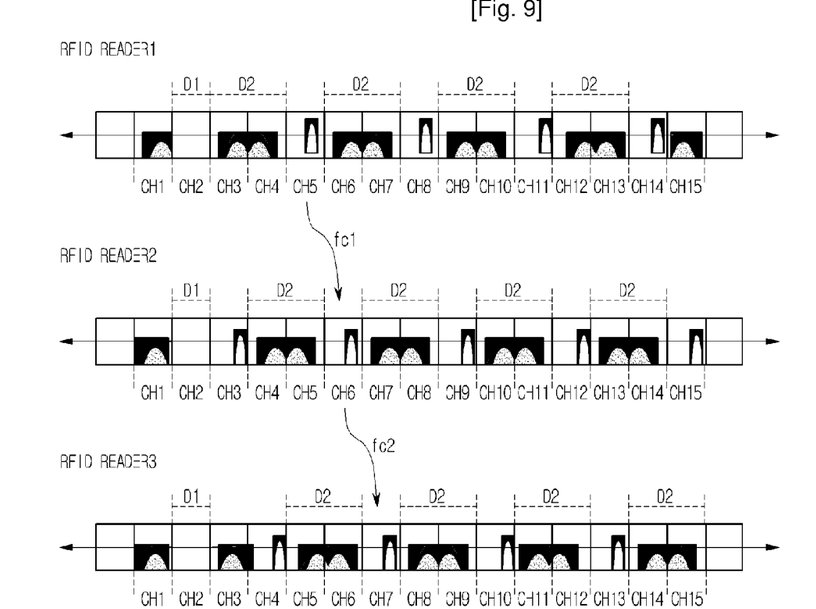
FIG. 9 is a view showing a frequency hopping operation of readers according to the embodiment.

FIG. 9 is a view showing a frequency hopping operation of the readers according to the embodiment.

Referring to FIG. 9, channel duration D1 refers to an interference frequency channel, and channel duration D2 refers to duration in which tag information is processes after hopping. The first short range wireless communication module performs frequency hopping fc to channel 5 to deliver the channel 5 to the first leader when interference occurs in channel 2. The second short range wireless communication module performs frequency hopping fc to channel 6 based on channel 3 to deliver the channel 6 to the second reader when the interference occurs in channel 2. The third short range wireless communication module performs frequency hopping fc to channel 7 based on channel 4 to deliver the channel 7 to the third reader when the interference occurs in channel 2. The above frequency hopping is performed to different channels, except for the interference channels.

When interference occurs in channel 2 in the sensor network, hopping is performed with a preset channel interval by using channels excluding an interference channel. In detail, the hopping is achieved in the order of channel 5, channel 8, channel 11, and channel 14, the order of channel 3, channel 6, channel 9, channel 12, and channel 15, and the order of channel 4, channel 7, channel 10, and channel 13. In this case, the frequency hopping is carried out with the interval of three channels. In addition, the hopping may be carried output with various intervals when channel interference occurs. Accordingly, neighboring RF readers in a predetermined area can receive tag information without the influence of an interference phenomenon, so that a tag recognition rate can be improved.

Figure 10:
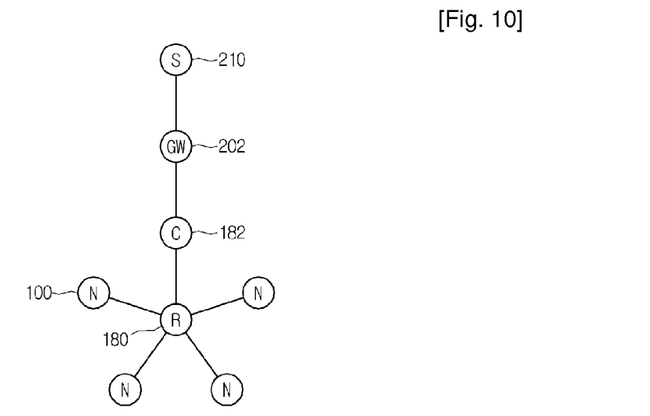
FIGS. 10 to 12 is a view showing a network topology of a short range communication module of FIG. 4 according to the embodiment.
Figure 11:
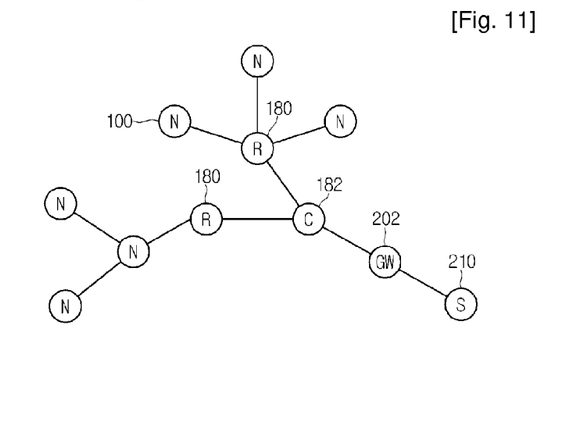
Figure 12:
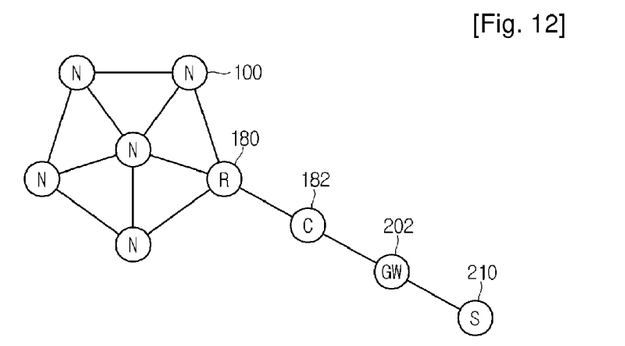

FIGS. 10 to 12 are views showing a network topology formed by a short range wireless communication module according to the embodiment. Hereinafter, a ZigBee module will be described as an example of the short range wireless communication module.

FIG. 10 is a view showing a start-type sensor network in which a plurality of sensor nodes (N) 100 are connected to one router (R) 180 in the shape of a star. FIG. 11 is a view showing a mesh-type sensor network in which a plurality of sensor nodes (N) 100 are connected to a plurality of routers (R) 180 in the shape of a mesh. FIG. 12 is a view showing a cluster tree-type sensor network in which a plurality of sensor nodes (N) 100 is connected to one router 180 in the shape of a cluster tree.

In the sensor network, a full function node (FFD) and a reduced function node (RFD) may constitute a ZigBee network around a coordinator. The FDD performs a data routing function, and the RFD only delivers measured data to the FFD. One ZigBee network includes several tens to several tens of thousands of nodes, and may be constituted suitably for the efficiency of power and a network bandwidth.

Figure 13:
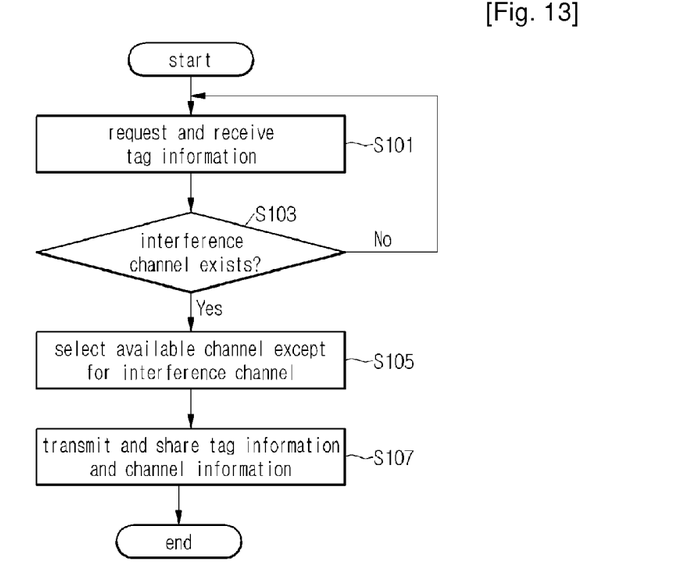
FIG. 13 is a flowchart showing a node-type frequency counting mode according to the embodiment.

FIG. 13 is a flowchart showing the node-type frequency counting mode according to the embodiment.

Referring to FIG. 13, a sensor node transmits an information requesting signal to a tag and receives tag information (step S101). In this case, a reader of the sensor node determines the existence of an interference channel(step S103). If the interference channel exists, the reader delivers information about the interference channel to a short range wireless communication module. The short range wireless communication module selects a channel to be used except for the interference channel (step S105), and transmits the channel to be used to the reader such that the reader transmits/receives information to/from a tag. In addition, the information about the interference channel, the use channel, and the tag is delivered to another short range wireless communication module, and is shared in a sensor network (step S107). Accordingly, sensor nodes in the sensor network can select channels except for the interference channel and channels used by another node.

Figure 14:
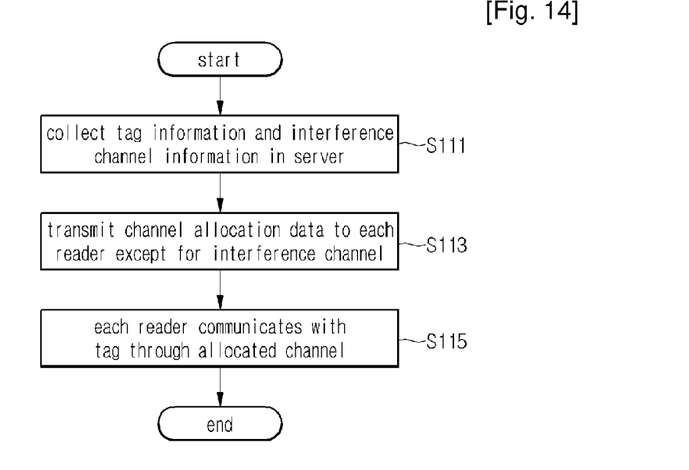
FIG. 14 is a flowchart showing a network-type frequency counting mode according to the embodiment.

FIG. 14 is a flowchart showing the network-type frequency counting mode according to the embodiment.

Referring to FIG. 14, a server collects information about an interference channel and a tag (step S111). Then, channel allocation data excluding the interference channel are transmitted to each sensor node (step S113), so that each sensor node makes communication a tag through an allocated channel (step S115). In the network-type channel allocation mode, when a plurality of sensor networks exists, the server integrally collects information about interference channels and allocates channels except for the interference channels to the sensor nodes.

Although the embodiments are described, this is illustrative purpose, and the present invention is not limited thereto. It should be understood that numerous other modifications and embodiments can be devised by those skilled in the art that will fall within the spirit and scope of the principles of this disclosure.

INDUSTRIAL APPLICABILITY

In a sensor device, a sensor network system, and a sensor device control method according to the embodiment, a tag recognition rate can be enhanced.

In addition, the tag recognition rate is enhanced, so that the reliability of an RFID technology can be improved.

Further, the interference between neighboring readers can not be able to consider a lot, so that the degree of freedom for reader arrangement can be ensured.

An RFID system can be effectively constructed regardless of surrounding environment or surrounding facilities.

A control system of readers over a network is not complicated

In addition, initial and present states of readers in a sensor network are monitored in real time, so that the readers can be effectively managed.

The invention claimed is:
1. A sensor device comprising:
  a reader for requesting a tag information and detecting an interference channel; and
  short range wireless communication module for transmitting or receiving a Information of the interference channel through short range wireless communication to share the interference channel information,
  wherein the reader comprises:
  a radio frequency (RF) processor for making communication with a tag;
  an interference channel detector for sensing intensity of a signal received from an antenna to detect the interference channel; and
  a reader controller connected to the short range wireless communication module, in which the reader controller delivers the interference channel information to the short range wireless communication module and receives information of a channel to be used.
2. The sensor device as claimed in claim 1, wherein the reader is connected to the short range wireless communication module through a wire interface.

3. The sensor device as claimed in claim 1, the short range wireless communication module comprises at least one among a ZigBee module, a wireless LAN or WiFi, a ultra wide band (UWB) module, a Bluetooth module, a world interoperability for microwave access (WiMax) module, a wireless broadband (WiBro) module, and a dedicated short range communication (DSRC) module.

4. The sensor device as claimed in claim 1, wherein the short range wireless communication module reallocates a channel except for the interference channel and channels used by other readers.

5. The sensor device as claimed in claim 1, comprising a signal splitter that commonly connects the reader and the short range wireless communication module to an antenna.

6. A sensor device comprising:
a reader for requesting a tag information and detecting an interference channel; and
a short range wireless communication module for sharing a information of the Interference channel through short range wireless communication, and reallocating channels to be used for the reader,
wherein the reader comprises:
a radio frequency (RF) processor for making communication with a tag;
an interference channel detector for sensing intensity of a signal received from an antenna to detect he interference channel; and
a reader controller connected to the short range wireless communication module, in which the reader controller delivers the interference channel information to the short range wireless communication module and receives information of a channel to be used.

7. The sensor device as claimed in claim 6, wherein the interference signal detector comprises:
a signal coupler for coupling the received signal;
a signal transformer for transforming the coupled signal into a signal having an intermediate frequency; and
a filter for detects the interference channel from the signal having the Intermediate frequency.

8. The sensor device as claimed in claim 6, wherein the reader controller delivers the tag information and the interference channel information to the short range wireless communication module, and receives a reallocated channel information to control the RF processor.

9. The sensor device as claimed in claim 6, wherein the reader makes communication in an ultra high frequency (UHF) band, and the short range wireless communication module makes communication in a band of 2.45 GHz.

10. The sensor device as claimed in claim 6, wherein the reader controller processes a information related to frequency hopping through a channel coding scheme using a time-frequency hopping spread spectrum (T-FHSS) time synchronization scheme.

11. The sensor device as claimed in claim 6, wherein the short range wireless communication module comprises a ZigBee module, and the ZigBee module operates by using at least one of a reduced function device (RFD) module and a full function device (FFD) module.

12. A sensor network system comprising:
a sensor for making communication with a tag, and transmitting a node Information comprising a information of the tag and a interference channel Information;
a coordinator module for collecting the node information of the sensor; and
a server for reallocating a channel of the sensor based on the node information collected from the coordinator module and transmitting a information of the reallocated channel,
wherein the sensor comprises:
a reader for making communication with the tag; and
a short range wireless communication module connected to the reader, in which the short range wireless communication module makes short range wireless communication with other sensors,
wherein the reader comprises:
a radio frequency (RF) processor for making communication with a tag;
an interference channel detector for sensing intensity of a signal received from an antenna to detect the interference channel; and
a reader controller connected to the short range wireless communication module, in which the reader controller delivers the interference channel information to the short range wireless communication module and receives information of a channel to be used.

13. The sensor network system as claimed in claim 12, comprising a router interposed between the short range wireless communication module and the coordinator module.

* * * * *